United States Patent

Novak

[15] 3,706,841

[45] Dec. 19, 1972

[54] METHOD AND APPARATUS FOR CONVERTING MONOCHROME PICTURES TO MULTI-COLOR PICTURES ELECTRONICALLY

[72] Inventor: Joseph F. Novak, 447 Ridge Court, Roselle, Ill. 60172

[22] Filed: Sept. 17, 1971

[21] Appl. No.: 181,425

[52] U.S. Cl..........178/5.4 R, 178/5.2 R, 178/5.4 CD, 178/6.6 A

[51] Int. Cl...............................................H04n 9/02

[58] Field of Search...178/5.4 R, 6.6 A, 5.2 R, 5.2 A, 178/5.2 D, 5.4 CD

[56] References Cited

UNITED STATES PATENTS

| | | | |
|---|---|---|---|
| 3,551,589 | 12/1970 | Moskovitz | 178/5.4 R |
| 3,647,942 | 3/1972 | Siegal | 178/5.4 R |
| 3,673,317 | 6/1972 | Newell et al. | 178/5.2 R |

FOREIGN PATENTS OR APPLICATIONS

| | | | |
|---|---|---|---|
| 933,938 | 8/1963 | Great Britain | 178/5.4 R |

*Primary Examiner*—Robert L. Richardson
*Attorney*—Sominik, Knechtel & Godula

[57] ABSTRACT

A method and apparatus for converting black and white or monochrome pictures to multi-color pictures electronically.

13 Claims, 4 Drawing Figures

INVENTOR
JOSEPH F. NOVAK

Dominik, Knechtel and Godula

ATTYS.

METHOD AND APPARATUS FOR CONVERTING MONOCHROME PICTURES TO MULTI-COLOR PICTURES ELECTRONICALLY

This invention relates to a method and apparatus for converting black and white or monochrome pictures to multi-color pictures electronically.

In U.S. Pat. application, Ser. No. 131,758, filed Apr. 6, 1971, by the present applicant, there is disclosed a method of converting black and white or monochrome originals to multi-color pictures including the steps of projecting the image of the black and white film onto a rear projection screen, applying color to the image and thereafter photographing the image on color film so as to obtain a film containing color and detail. The method is primarily or particularly directed to converting existing black and white or monochrome originals to ones of multi-color. The present invention relates to a method whereby this can be accomplished electronically. The invention therefore is distinguished from those processes which are presently known, where special black and white film is used to photograph an abject or scene, and then is used to control other special electronic equipment to produce a multi-color picture in accordance with the recorded black and white images.

In carrying out the method of the present invention, three principal components or pieces of equipment are required, namely: a color video tape recorder-playback unit, a black and white video camera, and a color monitor. Basically, a black and white image is picked up by the black and white video camera and displayed on the color monitor. A video tape is produced, using the color video tape recorder-playback unit, with color signals that correspond to the area of the black and white image to be colored. The output signals of the black and white video camera and the video tape recorder-playback unit are combined to form a color picture on the color monitor, using the varying signal voltages of the black and white video camera to control the amount of color displayed on the color monitor. Where total black appears on the black and white picture, no color appears on the color monitor. Conversely, where no black appears on the black and white picture, the full color brilliance appears on the color monitor. Varying shades of black control the amounts of color to be displayed thus producing a colored picture with varying shades of color and also black and white at the extreme ranges of the color spectrum. The color picture displayed on the color monitor then can be either photographed on film or recorded on video tape.

The resolution capabilities of the various components of the system are dependent upon the final format of the pictures. In particular, where the normal vertical scanning rate of television or video systems in the United States is 525 lines, this is satisfactory for color video tapes. A much higher scanning rate is preferred for producing color films to be used for projection purposes.

Accordingly, it is an object of the present invention to provide an improved method and apparatus for converting black and white or monochrome pictures to multi-color pictures, electronically.

Another object is to provide a method and apparatus for converting existing black and white or monochrome originals to multi-color pictures, electronically.

Still another object is to provide a method and apparatus of the above type wherein presently available equipment can be employed, with little modification required.

Other objects and advantages of the present invention will be apparent from the description set forth below, taken in conjunction with the drawings, in which.

Figure 1:
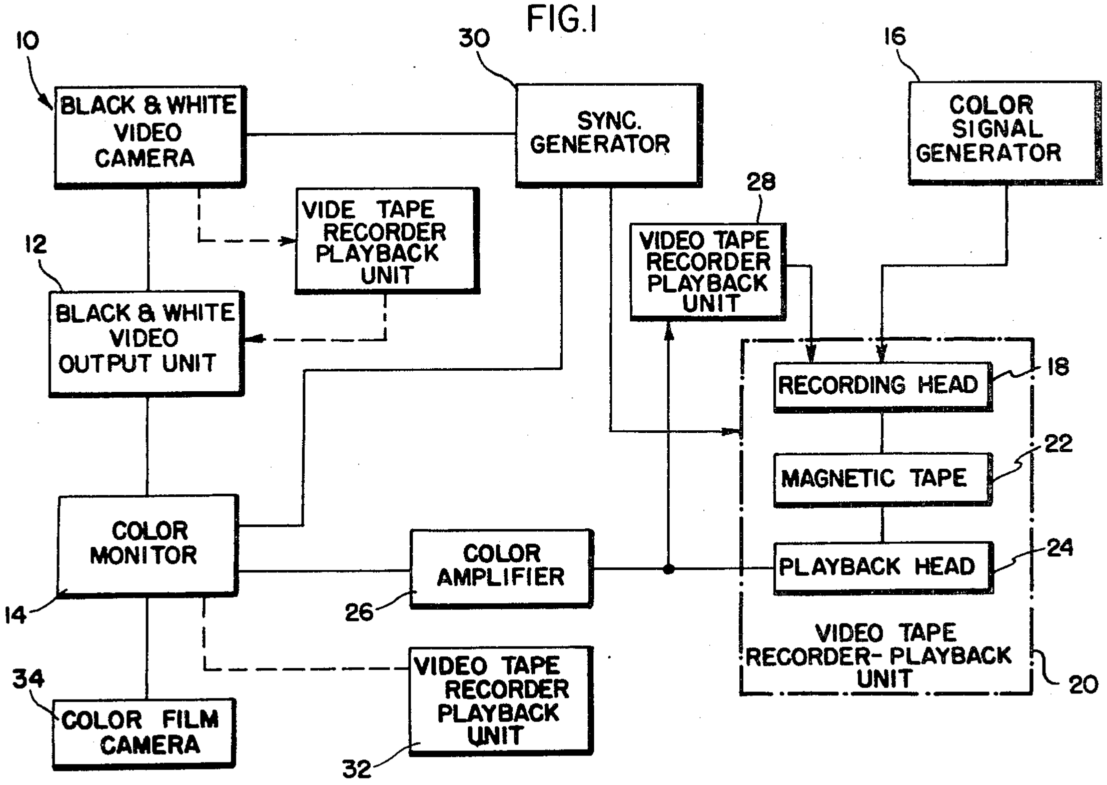
FIG. 1 is a block diagram schematic illustrating the method and apparatus of the present invention.

Referring now to FIG. 1 of the drawings, the apparatus for converting black and white or monochrome pictures to multi-color pictures in accordance with the method of the invention is illustrated in block diagram schematic, and can be seen to include a black and white (monochrome) video camera 10 for scanning the black and white picture to be converted to color. The video camera 10 has a scanning rate consistent with the end result desired. The 525 line scanning rate will produce satisfactory results for video tape since this is the normal mode in which it is presented. For colored film, the higher the scanning rate, the better the resolution of the resulting picture. Scanning rates for video tape of 1,000 to 2,000 lines or more are preferred. The video camera 10 in scanning the black and white picture produces output signals which vary continuously from 0 to maximum, depending upon the point of the black and white picture that is being scanned, and these output signals are coupled to a black and white video output unit 12.

This black and white video output unit 12 receives these output signals, and converts them to luminance signals which are coupled to a color monitor 14, for controlling the output of the three cathodes of its three electron guns. If the output signal from the video camera 10 represents a pure black signal voltage, the luminance signal generated will prevent any color from being displayed on the color monitor 14, while a pure white signal voltage will generate a luminance signal which will permit all colors to be produced on the color monitor and combined to form white portions thereof. Signal voltages between these maximums will generate luminance signals to permit intermediate ranges of colors and color brilliance. These luminance signals, therefore, will vary from 0 to 100 percent, depending upon the output signals from the video camera 10.

The black and white video output unit 12 also is provided with a contrast control, for varying the contrast of the output signal from the video camera 10 or, more specifically, the luminance signals provided by the black and white video output unit 12. By varying the contrast of the output signal, some color can be displayed in all portions of the picture. For this purpose, only a single contrast control is required, since the individual colors are variably controlled by a color signal generator 16.

The color signal generator 16 originates the various color signals ultimately displayed on the color monitor 14, with each of the three color signals being provided in varying increments of brilliancy from 0 to 100 percent. For this purpose, the signal generator 16 can be provided, for example, with a set of 10 pushbuttons for each of the three color signals, with each pushbutton representing 10 percent increments of color brilliancy, and an off switch which represents 0 percent color brilliancy. Such an arrangement having eleven possible combinations for each color signal will provide a possible 1,331 combinations of color.

The color signals generated by the color generator 16 are coupled to a video tape recorder-playback unit 20, and recorded on a magnetic tape 22. This video tape recorder-playback unit 20 has a recording head 18 for recording the color signals on the magnetic tape 22, and a completely separate playback head 24 which is arranged and adapted to read the color signals as they are recorded on the magnetic tape 22 by the recording head 18. The playback head 24 is coupled to a color amplifier 26 which drives the color monitor 14, in accordance with the color signals read off of the magnetic tape 22.

These color signals are placed on the magnetic tape 22 in the locations that correspond to the picture area, by triggering the recording head 18 to properly place the color signals generated by the color signal generator 16 on the magnetic tape 22, in a manner described more fully below. At the same time, the playback head 24 reads these color signals and drives a color amplifier 26 which, in turn, drives a color monitor 14. In this manner, color appears on the color monitor 14. The recording head 18 can be adjusted to color both pinpoint and/or wide areas similar to using various sizes of brushes for painting.

The color signals are recorded on the magnetic tape 22, with all colors being recorded in the brilliance that is generated by the color signal generator 16. These recorded signals, when displayed by themselves on the color monitor 14 only appear as patches of color with little picture detail, and hence do not constitute a picture. The black and white luminance signals coupled to the color monitor 14, however, color varying amounts of these color signals to produce a colored picture with shadows, shading and detail.

The magnetic tape 22 is of a size to accommodate the 2,000 or more lines, and to allow for easy access to any area by the recording head 18 for pinpoint recording. Normally, the magnetic tape 22 does not move and, in this sense, it functions similar to a scratch pad or chalk board. Furthermore, the colored signals recorded on it can be used for a subsequent picture, and corrected as required.

As indicated above, it can be seen that in order to apply color to a black and white picture on the color monitor 14, it is necessary to locate a point on the face of the color monitor to be colored, translate this location to a location on the magnetic tape 22, and trigger the operation of the recording head 18 to record a signal that corresponds to the intensity of the combination of three colors to be recorded. These signals then must be picked up and fed to the color monitor 14, as superimposed color.

Figure 2:
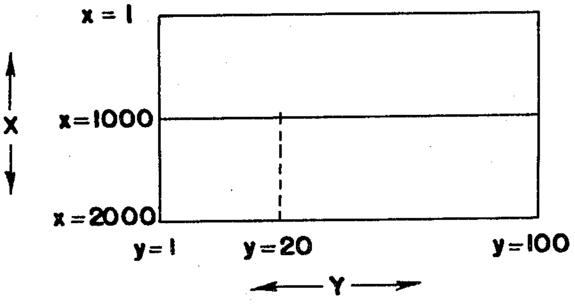
FIG. 2 is a plan view generally representing the face of the color monitor.

One manner in which the color can be applied to the magnetic tape 22 and then fed to the color monitor 14 is described below, in conjunction with FIGS. 2–4 of the drawings. In FIG. 2, the face of the color monitor 14 is illustrated, with the face being defined with $x$ and $y$ coordinates. The $x$ coordinate represents the number of vertical scanning lines and, in the illustrated example, 2,000 scanning lines are shown. The $y$ coordinate represents positions on a picture line of horizontal scanning. Since a picture line represents an infinite number of points or positions, a particular point on that picture line can be expressed in a percentage along that picture line. For example, the point or position "a" illustrated in FIG. 2 can be expressed by the coordinates $x = 1,000$, $y = 20$, with this point "a" being on the 1,000th vertical scanning line and 20 percent along its length from the left side of the face of the color monitor.

Figure 3:
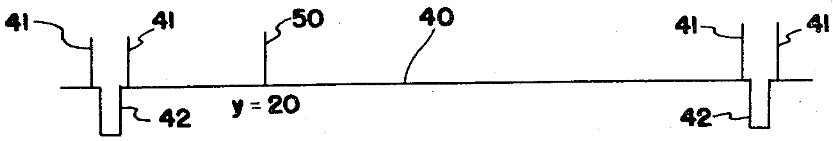
FIG. 3 represents one vertical scanning line, or picture line, illustrating thereon the manner in which a particular point or position on the face of the color monitor is located and recorded on the magnetic tape.

This point "a," and any other point on the face of the color monitor 14 can be located, by use of a stylist or pointer (not shown) which is movable along the $x$ and $y$ coordinates, and which is coupled to a pair of $x$ and $y$ transducers (not shown) which are operable to produce voltage signals representing the $x$ and $y$ coordinate position of the stylist to trigger the recording head 18 to properly place the color signals generated by the color generator 16 on the magnetic tape 22, as generally illustrated in FIG. 3.

In FIG. 3, the line 40 represents the 1000th vertical scanning line, or picture line 1000 having the same $x$ coordinate, this line further being defined by the vertical blanking pulses 41 and the vertical sync pulses 42, in the well-known manner. The pulse 50 represents the color signals generated by the color generator 16 and recorded on the magnetic tape 22, by the recording head 18. The pulse 50 is recorded on the magnetic tape 22, at a point along the length of the line 40 corresponding to the $y$ coordinate of 20.

Figure 4:
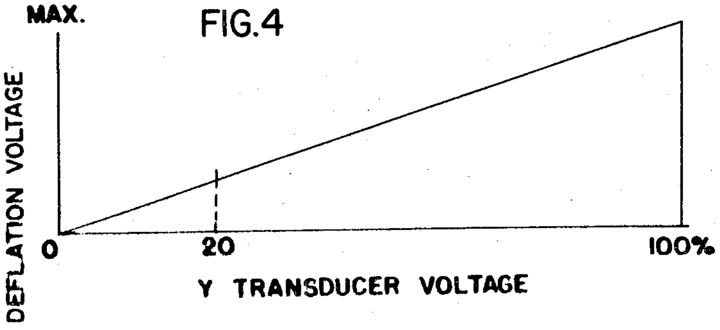
FIG. 4 is a graph indicating the manner in which the recording head is triggered to record the color signals on the magnetic tape.

This $y$ coordinate can be located, as illustrated in FIG. 4, which shows the deflection voltage produced by the $y$ transducer, which voltage varies from 0 to a maximum voltage defining the beginning and end of the line 40, i.e., the left side and the right side of the face of the color monitor 14, respectively. Accordingly, when the $y$ transducer voltage is 20 percent of the maximum voltage, the recording head 18 is triggered to apply a signal to the magnetic tape 22, thereby defining the location on the magnetic tape. The triggering circuitry preferably and advantageously is adjustable to trigger the recording head 18 at some voltage lower than that representing a specific point and discontinue the applying of signals at some point above that representing a specific point. In this manner, it is possible to apply the same color signals over a wide area of a picture line on the magnetic tape 22, using a specific point as the center reference for the triggering of the recording head 18. The range over which the recording head 18 is triggered is adjustable to cover a specific point, or a wide or narrow area, thus allowing broad areas to be colored on the color monitor 14 while only referencing the center points on each picture line.

A second video tape recorder-playback unit 28 can be provided and used to store completed color information for future use. This video tape recorder-playback unit 28 also simultaneously reads the signals recorded on the magnetic tape 22, stores the same on a magnetic tape contained therein, and is adapted to retrieve this recorded information and again record it on the magnetic tape 22. It may have its own recording and playback heads or, alternatively, the recording head 18 and the playback head 24 can be employed.

The color signals contained on the magnetic tape 22 and supplied by the playback head 24 to the color amplifier 26 operates the latter to produce color signals to control the amounts of each color to be displayed on the color monitor 14. The color amplifier has controls for varying the brightness of the whole picture and the brilliance of each color separately from the others. Three individual color amplifiers are used, and these amplifiers feed their respective signals to the color electron guns of the color monitor 14.

A scanning synchronizer 30, normally called a sync generator, generates a signal frequency corresponding to the scanning rate, and this signal is coupled to and used to control the scanning rates of the black and white camera 10, the video tape recorder-playback unit 20 and the color monitor 14.

The color picture displayed on the color monitor, in the above-described fashion, can be permanently recorded, by means of a color video tape recorder-playback unit 32, or alternatively, by means of a color film camera 34.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

I claim:

1. A method of converting black and white or monochrome pictures to multi-color pictures comprising the steps of:

scanning the picture to be converted with a video camera to produce a black and white image thereof and displaying said image on a color monitor;

producing video color signals in locations that correspond to the areas of said black and white image to be colored;

storing said video color signals; and reading said stored video color signals and coupling the same to said color monitor to combine said color signals with said black and white image displayed thereon to form a color picture on said color monitor.

2. A method of converting black and white or monochrome pictures to multi-color pictures comprising the steps of scanning the picture to be converted with a video camera which produces electrical output signals representative thereof;

coupling said electrical output signals to a color monitor to drive the latter to produce thereon an image of said picture;

selectively generating color signals in pre-established increments of color brilliancy;

recording said color signals on a magnetic tape in the locations thereon corresponding to the areas of said picture to which the color represented by said color signals is to be applied to said picture;

reading the recorded color signals on said magnetic tape and coupling the same to said color monitor to drive the latter to produce colors thereon in accordance with said color signals;

said colors being superimposed with the image produced on said color monitor by said electrical output signals to thereby produce on said color monitor an image defining a color picture with shadows, shading and detail.

3. The method of claim 2, further including the step of photographing said image defining a color picture with shadows, shading and detail with a color film camera.

4. The method of claim 2, further including the step of coupling the signals driving said color monitor to a video tape recorder-playback unit and recording said signals on a magnetic tape, whereby said color picture with shadows, shading and detail can be electrically recorded and reproduced.

5. The method of claim 2, further including the steps of coupling the recorder color signals on said magnetic tape to means including a second magnetic tape to drive the same to record said color signals on said record tape for storage for future use.

6. Apparatus for converting black and white or monochrome pictures to multi-color pictures comprising in combination:

a color monitor;

means for scanning said picture to be converted and for producing electrical output signals representative thereof, said electrical output signals being coupled to and driving said color monitor to produce a black and white image of said picture on said color monitor;

means for selectively generating color signals in pre-established increments of color brilliancy;

means for storing said color signals in the locations corresponding to the areas of said picture to which the color represented by said color signals is to be applied to said picture;

means for reading the stored color signals and coupling the same to said color monitor to drive the latter to produce color thereon in accordance with said color signals;

said colors being superimposed with the image produced on said color monitor by said electrical output signals to thereby produce on said color monitor an image defining a color picture with shadows, shading and detail.

7. The apparatus of claim 6 further including means for photographing said image to produce a color film thereof.

8. The apparatus of claim 6, further including storage means for recording and reproducing said color signals on said magnetic tape, whereby said color signals can be stored for future use.

9. The apparatus of claim 6, wherein said means for scanning the picture comprises a video camera having a high scanning rate within a range of at least 525 lines to 2,000 lines or greater.

10. The apparatus of claim 6, further including means coupled between said scanning means and said color monitor for converting said electrical output signals to luminance signals for controlling the ranges of color brilliancy generated by said color monitor.

11. The apparatus of claim 6, wherein said means for converting said electrical output signals to luminance signals further includes means for varying the contrast of said electrical output signals from said scanning means, whereby some color can be displayed in all portions of the color picture displayed on said color monitor.

12. The method of claim 1, wherein said video color signals are recorded and stored on video magnetic tape.

13. The apparatus of claim 6, wherein said means for storing said color signals comprises magnetic tape.

* * * * *